(12) United States Patent
Robertsson

(10) Patent No.: US 7,426,438 B1
(45) Date of Patent: Sep. 16, 2008

(54) TECHNIQUE TO PROVIDE SEISMIC DATA-BASED PRODUCTS

(75) Inventor: Johan Olof Anders Robertsson, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 74 days.

(21) Appl. No.: 11/687,296

(22) Filed: Mar. 16, 2007

(51) Int. Cl.
*G06F 15/00* (2006.01)

(52) U.S. Cl. .......................... 702/14; 705/26

(58) Field of Classification Search .................. 702/14, 702/2, 10, 11, 118, 182–185, 188; 705/5, 705/10, 11, 25, 26
See application file for complete search history.

(56) References Cited

U.S. PATENT DOCUMENTS

| 6,775,618 | B1 | 8/2004 | Robertsson et al. |
| 6,829,570 | B1 * | 12/2004 | Thambynayagam et al. .. 703/10 |
| 2006/0100912 | A1 * | 5/2006 | Kumar et al. ................. 705/4 |
| 2007/0067226 | A1 * | 3/2007 | Caine ......................... 705/27 |

FOREIGN PATENT DOCUMENTS

GB 2 414 299 11/2005

* cited by examiner

*Primary Examiner*—Edward Raymond
(74) *Attorney, Agent, or Firm*—Fred G. Pruner, Jr.; Liangan (Mark) Ye; Jeffrey E. Griffin

(57) ABSTRACT

A technique includes providing a pricing scheme to sell at least one seismic data-based product. The seismic data-based product(s) are generated from seismic data that is obtained from at least one sensor in tow, and the seismic data includes particle motion data, which the pricing scheme excludes from being sold.

17 Claims, 4 Drawing Sheets

TECHNIQUE TO PROVIDE SEISMIC DATA-BASED PRODUCTS

BACKGROUND

The invention generally relates to a technique to provide seismic data-based products.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes providing a pricing scheme to sell at least one seismic data-based product. The seismic data-based product(s) are generated from seismic data that is obtained from at least one sensor in tow, and the seismic data includes particle motion data, which the pricing scheme excludes from being sold.

In another embodiment of the invention, a data product for marine exploration includes at least one seismic data set. The seismic data set includes seismic pressure data that is obtained from at least one sensor in tow. The seismic data set includes data that is derived from particle motion data; and the seismic data set has a first price.

Advantages and other features of the invention will become apparent from the following drawing, description and claims.

DETAILED DESCRIPTION

Figure 1:
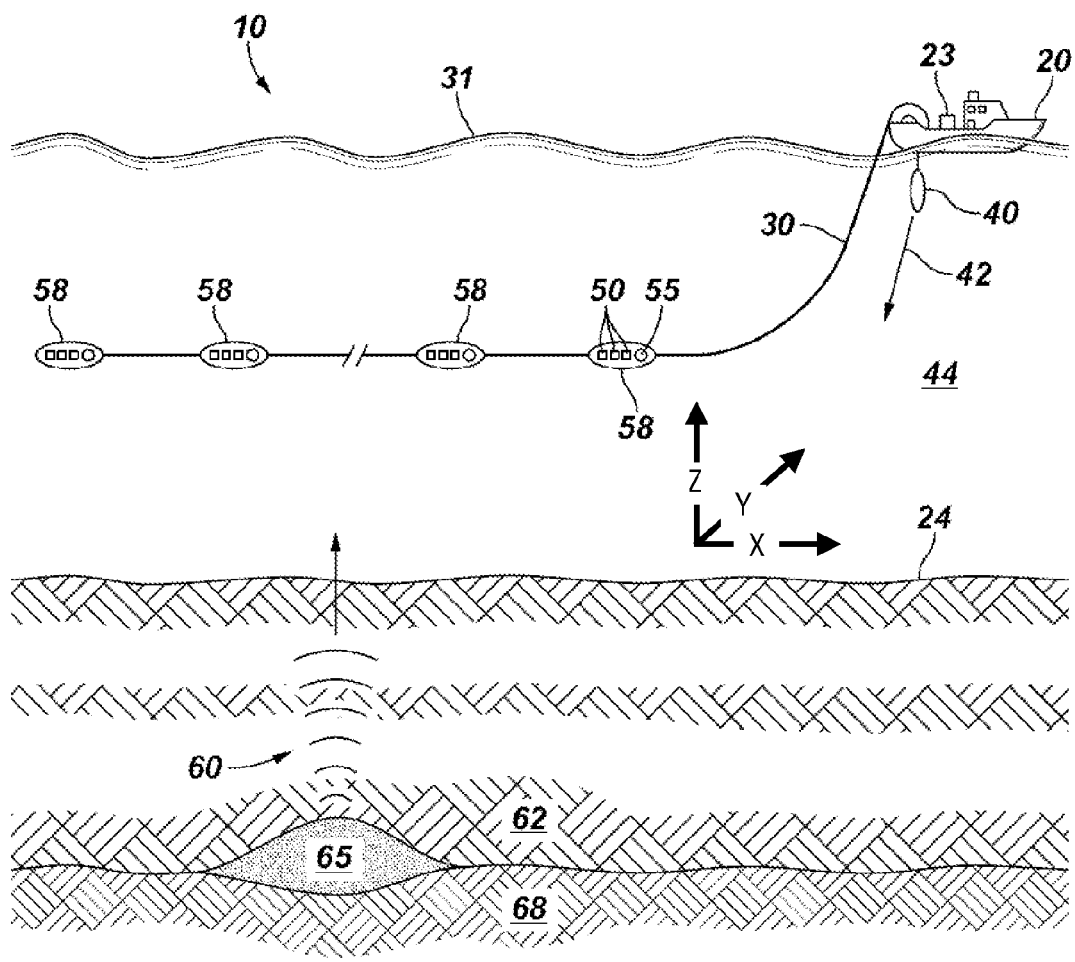
FIG. 1 is a schematic diagram of a marine seismic data acquisition system according to an embodiment of the invention.

FIG. 1 generally depicts a marine seismic data acquisition system 10, which may be used to record multi-component seismic data, which includes pressure data as well as particle motion data. The multi-component seismic data is processed to produce seismic data-based deliverables, or products, which are sold pursuant to a multi-tier pricing scheme that excludes the sale of the particle motion data, as further described below.

Referring to FIG. 1, the marine seismic data acquisition system 10 acquires the multi-component seismic data by towing one or more seismic streamers 30 (one exemplary streamer 30 being depicted in FIG. 1) behind a survey vessel 20. The seismic streamers 30 may be several thousand meters long and may contain various support cables (not shown), as well as wiring and/or circuitry (not shown) that may be used to support communication along the streamers 30.

Each seismic streamer 30 contains seismic sensors, which record seismic signals. In accordance with some embodiments of the invention, the seismic sensors are multi-component seismic sensors 58, each of which is capable of detecting a pressure wave field and at least one component of a particle motion that is associated with acoustic signals that are proximate to the multi-component seismic sensor 58. Examples of particle motions include one or more components of a particle displacement, one or more components (inline (Vx), crossline (Vy) and depth (Vz) velocity components, for example) of a particle velocity and one or more components of a particle acceleration. To clarify the following description, it is assumed the particle motion data includes velocity (Vx, Vy and Vz) data, although the particle motion data may alternatively or additionally include particle acceleration data, in other embodiments of the invention.

Depending on the particular embodiment of the invention, the multi-component seismic sensor 58 may include one or more hydrophones, geophones, particle displacement sensors, particle velocity sensors, accelerometers, or combinations thereof. For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary geological formation 65 that is depicted in FIG. 1.

The incident acoustic signals 42 that are generated by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the detected pressure waves and the detected particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wave field by its hydrophone 55; and the sensor 58 may provide one or more traces that correspond to one or more components of particle motion, which are measured by its accelerometers 50.

Figure 4:
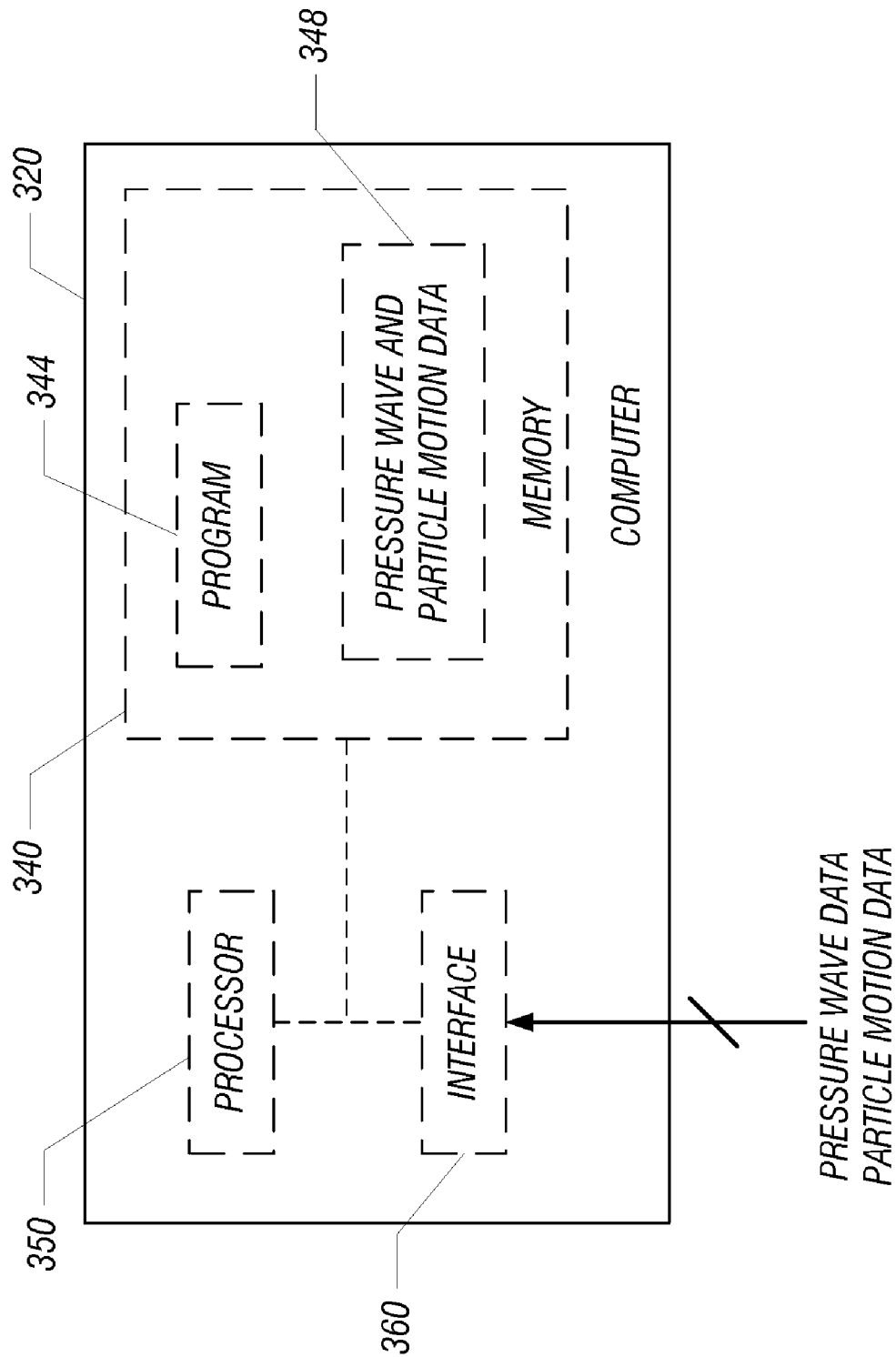
FIG. 4 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 120 that is depicted in FIG. 4 and further described below) that may be, for example, located on land or on the vessel 20.

The down going pressure waves create an interference known as "ghost" in the art. Depending on the incidence angle of the up going wave field and the depth of the streamer cable, the interference between the up going and down going wave fields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wave field into up and down going components is often referred to as wave field separation, or "deghosting." The particle motion data that is provided by the multi-component seismic sensor 58 allows the recovery of "ghost" free data, which means data that is indicative of the up going wave field.

The raw seismic data obtained from the survey may be acquired by a provider of seismic data-based deliverables, or products. In other words, the provider may perform some degree of processing of the raw multi-component seismic data to generate the seismic data-based products. As an example, the provider may be the entity that conducts the survey depicted in FIG. 1 or as another example may be an entity that purchases the raw seismic data.

Figure 2:
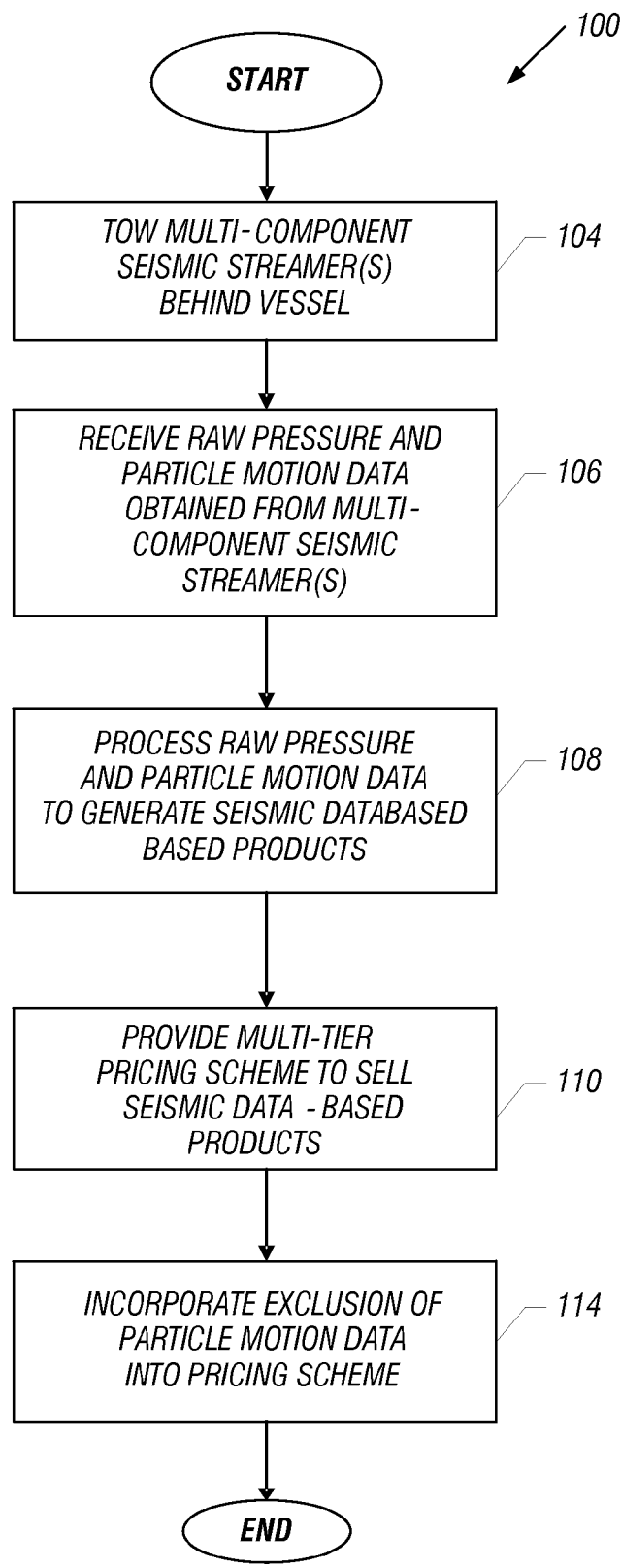
FIG. 2 is a flow diagram depicting a technique to generate and sell multi-component seismic data-based products according to embodiment of the invention.

Referring to FIG. 2, in general, the raw seismic data may be acquired, transformed into seismic data-based products and sold pursuant to a technique 100, in accordance with some embodiments of the invention. The technique 100 includes towing (block 104) one or more multi-components seismic streamer(s) behind a vessel and receiving (block 106) pressure and particle motion data (i.e., raw multi-component seismic data) from the towed seismic sensors.

Pursuant to the technique 100, the raw seismic data is processed (block 108) to generate seismic data-based deliverables, or products. As described below, these products are generated by different levels of processing, with the more expensively-priced products being associated with greater degrees of processing. Therefore, pursuant to the technique 100, a multi-tier pricing scheme is used (block 110) to sell the seismic products. Incorporated into this pricing scheme is a provision to exclude the sale of the particle motion data, pursuant to block 114. As described herein, the particle motion data may be used to generate the higher priced seismic data-based products that are sold pursuant to the multi-tiered pricing scheme.

Particle motion data allows the development of seismic data-based products that overcome the shortcomings of seismic exploration which existed before the availability of this data. As set forth below, particle motion data permits the generating of such seismic data-based products as deghosted pressure data; deghosted and regularized pressure data; and various seismic answer products, as examples.

The particle motion data greatly aids the processing of the seismic data to remove down-going waves, otherwise called "ghosts," and as a result of this removal, the streamers may be towed at greater depths. More particularly, a fundamental limitation of seismic data quality before the availability of multi-component data (and thus, particle motion data) was the streamer towing depth, as hydrophone seismic streamers had to be towed near the sea surface in order to record data within the seismic data band that otherwise would be lost due to destructive interference of primaries and their corresponding ghosts. Towing the streamers near the sea surface led to such drawbacks as reduced data bandwidth (low and high frequencies) and the sea noise introduced by the surface wave motion. Although in the past different tow depths may have been used to, for instance, avoid currents if the sea surface was rough, the resultant ghosts from the rough sea surface introduced noise in the data.

With the advent of particle motion data, the seismic data may be more readily deghosted, thereby leading to greater towing depths. The vertical component (Vz) of the particle motion data complements the hydrophone recordings in that all ghost notches in the frequency spectrum complement those in the hydrophone data spectrum. This is a consequence of the fact that the sea surface reflection coefficient largely is equal to −1 in terms of pressure but equal to +1 in terms of vertical particle motion data.

The basic step of wavefield decomposition addresses all of the above-mentioned challenges that were encountered when particle motion information was not available. Wavefield decomposition may include the use of, for example, pressure (P) data and the component of the particle motion data, which is indicative of the velocity component (Vz) in the z, or depth, direction (see axes in FIG. 1) only. The seismic data that is indicative of the crossline component (Vy) data may also be used for purposes of simplifying the three-dimensional (3-D) imaging description.

Another typical limitation with conventional, non-multi-component seismic data has to do with surface sampling both on the source and receiver side. On the receiver side a number of streamers (e.g., 10) are towed a fixed distance apart in the cross-line direction (e.g., 50 m, 100 m or 200 m). Although a large patch is covered, there may be severe gaps in the recorded data due to the sparse cross-line streamer separation. Algorithms for multiple attenuation such as surface-related multiple elimination (SRME) requires data to be recorded in these gaps, and sophisticated interpolation techniques typically are applied to predict what the recorded data would have been. Unfortunately, the streamer separations are often too coarse to allow for successful interpolation in data areas with complex multiples.

In addition, in so-called time-lapse surveys for reservoir monitoring, one or more repeat surveys are often used to reproduce the source and receiver positions of the base survey as close as possible. Although, the latest generation acquisition technology may offer excellent steering and position capabilities, regularization (e.g., streamer feathering) is still required to correct for the residual mispositioning.

With the availability of multi-component data, the recorded Vy data is equivalent to the gradient of the recorded pressure data (with its ghost) in the cross-line direction (this follows from the equation of motion, i.e., Newton's second law). Therefore, the seismic data may be interpolated to fill in the missing gaps. With the Vy data that is provided by the multi-component data, the streamer separation may be close to a factor of two further apart compared to a hydrophone-only streamer to yield the same data quality.

The basic step of interpolation addresses both of the above mentioned applications (multiple prediction and time-lapse) as well as several others and involves the P and Vy data only. It is noted that the seismic data may be interpolated before or after (as described herein) deghosting, depending on the particular embodiment of the invention.

The seismic data may be processed to produce a large number of seismic answer products in the areas of multiple attenuation, complex imaging, inversion and time-lapse representations. One exemplary seismic answer product, the multi-component SRME, is described herein.

One of the main areas where multicomponent streamers are expected to bring benefits is the area of multiple attenuation. The ability to better interpolate the data is expected to improve SRME results significantly. A key feature of the multicomponent SRME and other multiple attenuation or imaging algorithms is that the Vy data is needed "on the fly" to interpolate P data in the cross-line direction to different positions repeatedly. Hence, one single regularized data set, which includes interpolated P data to a desired position may not be sufficient to yield optimal benefits for multiple attenuation. Only the owner of the Vy data may produce the optimal SRME result. SRME is also likely to benefit from better quality (low noise) data as well as from deghosting and better source signature estimation.

Figure 3:
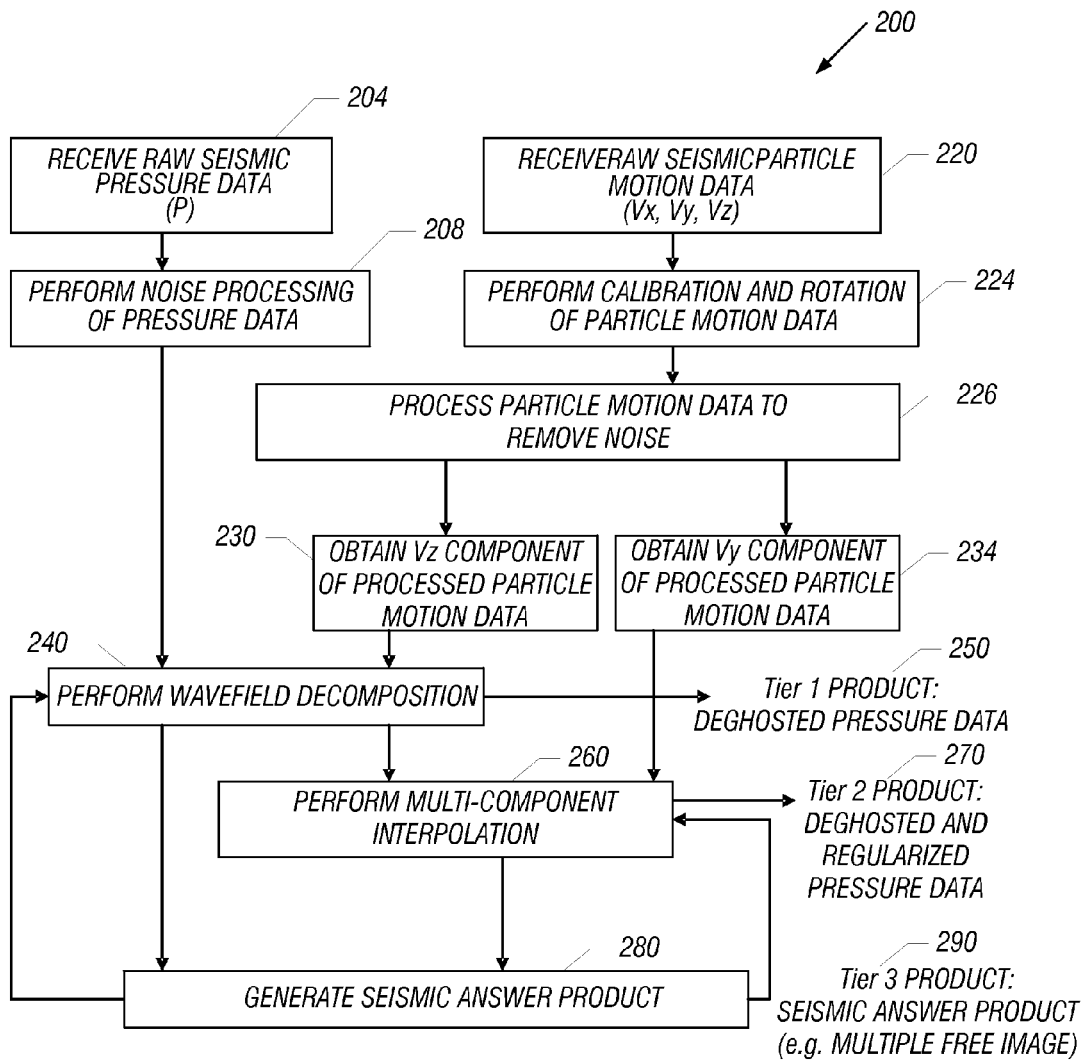
FIG. 3 is a flow diagram depicting a technique to generate the seismic data-based products from pressure and particle motion data according to an embodiment of the invention.

FIG. 3 depicts a more specific example of a technique 200 to generate seismic data-based deliverables, or products, in accordance with some embodiments of the invention. For the example that is described herein, the technique 200 produces three exemplary tiers of seismic data-based products 250, 270 and 290, each of which may be associated with a different price level. The lowest tier seismic data-based product 250 (i.e., the lowest priced product) is deghosted pressure data, which is generated by processing the P and Vz data at whatever positions that were achieved with steering during acquisition. The lowest tier product 250 is therefore processed pressure data, which offers substantial benefits to the customer: broad bandwidth (low and high frequencies); low noise as the depth increases away from the sea surface; optimal steering in currents (problematic current regimes may be avoided); and rough sea ghost removal.

The second tier seismic data-based product 270 (i.e., the midrange-priced product) is deghosted and regularized pressure data, which is produced by processing the P, Vy and Vz data. The second tier product 270 is essentially pressure data at all desired positions using interpolation functionality beyond the steering of the streamers to the best achievable positions. The second tier product 270 may be particularly desirable, for instance, for time-lapse applications.

The third tier seismic data-based product 290 (i.e., the highest priced product) is associated with such seismic products as multi-free images, which may be only achieved with access to the particle motion data, as such applications require the data to be interpolated "on the fly" as required internally by, for example, a multiple attenuation or imaging algorithm.

Depending on the particle embodiment of the invention, the seismic answer product may be (as examples) a time-lapsed image, a multiple-free image, a sub-salt image, a sub-basalt image, or a product inverted for rock properties, such as one or more impedances, velocities, or lithologies, fluid content, etc.

To summarize, the technique 200 includes receiving raw seismic pressure data (block 204) and receiving (block 220) raw seismic particle motion data. The particle motion data may include the Vx, Vy and Vz velocity data, for example. The pressure data is processed (block 208) to remove noise; and the particle motion data is processed in blocks 224 and 226. More specifically, the particle motion data is processed by first calibrating and rotating (block 224) the data to compensate for sensor misalignment and variations in sensor calibration. Next, noise reduction is performed (block 226) on the particle motion data. The result of the processing is relatively noise-free Vz (block 230) and Vy (block 234) particle motion data, which has been aligned and calibrated.

From the processed particle motion and pressure data, wavefield decomposition is performed, pursuant to block 240, to produce the tier one seismic data-based product 250. Multi-component interpolation processing, which uses the results of the wavefield decomposition and the Vy data may be performed (block 260) to produce the tier two seismic data-based product 270. For the third tier product 290, the deghosted and regularized pressure data as well as the deghosted pressure data is processed to generate (block 280) a seismic answer product.

Referring to FIG. 4, in accordance with some embodiments of the invention, a seismic data processing system 320 may perform portions of the techniques 100 (FIG. 2) and 200 (FIG. 3) and variations thereof for purposes of generating the seismic data-based products. In accordance with some embodiments of the invention, the system 320 may include a processor 350, such as one or more microprocessors and/or microcontrollers. The processor 350 may be coupled to a communication interface 360 for purposes of receiving seismic data that corresponds to pressure and particle motion measurements. As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various data sets involved with the generation of the seismic data-based products, as indicated by reference numeral 148. Furthermore, the memory 340 may store program instructions 344, which when executed by the processor 350, may cause the processor 350 to generate the seismic data-based products.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:

providing a pricing scheme to sell at least one seismic data-based product, the product being developed from seismic data obtained from at least one sensor in tow, wherein the seismic data includes particle motion data and the act of providing comprises providing a pricing scheme that excludes the sell of the particle motion data.

2. The method of claim 1, wherein said at least one seismic product includes multiple seismic data-based products, and the act of providing comprises:

incorporating price tiers into the price scheme, each price tier being associated with at least one of the multiple seismic data-based products.

3. The method of claim 1, further comprising:

designating each of the multiple seismic data-based products as belonging to one of the price tiers based on a degree of processing associated with generating the seismic data-based product.

4. The method of claim 1, wherein the seismic data further comprises pressure data;

the act of providing the pricing scheme comprises providing multiple price tiers into the pricing scheme; and associating a first one of the price tiers with deghosted pressure data.

5. The method of claim 4, further comprising:

associating a second one of the price tiers with deghosted and interpolated pressure data, said second of the price tiers being associated with a higher price than said first one of the price tiers.

6. The method of claim 5, further comprising:

associating a third one of the price tiers with a seismic answer product, said third one of the price tiers being associated with a price higher than a price of said second one of the price tiers.

7. The method of claim 6, wherein the seismic answer product comprises at least one of a time-lapsed image, a multiple-free image, a sub-salt image, a sub-basalt image, and a product inverted for rock properties comprising at least one of an impedance, a velocity, a lithology and a fluid content.

8. The method of claim 1, wherein the seismic data further comprises pressure data recorded by said at least one seismic sensor while in tow.

9. The method of claim 8, further comprising:

processing the pressure data to remove noise to generate processed pressure data;

processing the particle motion data to compensate the particle motion data for sensor calibration and alignment errors to generate compensated particle motion data;

processing the compensated particle motion data to remove noise to generate processed particle motion data; and processing the processed pressure data based on at least part of the processed particle motion data to generate at least one of the seismic data-based products.

10. The method of claim 1, further comprising:

towing said at least one seismic sensor behind a vessel; and recording the seismic data.

11. The method of claim 10, wherein the act of towing the seismic sensors comprises:

towing at least one streamer containing multi-component sensors.

12. A data product for marine exploration, comprising:

at least one seismic data set, wherein the seismic data set includes seismic pressure data obtained from at least one sensor in tow, wherein the seismic data set includes data derived from particle motion data and the seismic data set has a first price.

13. The data product of claim 12, wherein the seismic data set comprises deghosted pressure data.

14. The data product of claim 12, wherein the data product further comprises second seismic data set derived from the particle motion data and having a second price higher than the first price.

15. The data product of claim 14, wherein the second seismic data set comprises deghosted and regularized pressure data.

16. The data product of claim 14, wherein the data product further comprises a third seismic data set including data derived from particle motion data and having a third price greater than the second price.

17. The data product of claim 16, wherein the third seismic data set comprises a seismic answer product.

* * * * *